US012466318B2

(12) United States Patent
VanderPloeg, II et al.

(10) Patent No.: US 12,466,318 B2
(45) Date of Patent: Nov. 11, 2025

(54) DISPLAY ASSEMBLY

(71) Applicant: Gentex Corporation, Zeeland, MI (US)

(72) Inventors: John A. VanderPloeg, II, Zeeland, MI (US); Ethan J. Lee, Byron Center, MI (US); Andrew D. Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 80 days.

(21) Appl. No.: 18/403,207

(22) Filed: Jan. 3, 2024

(65) Prior Publication Data

US 2024/0217434 A1 Jul. 4, 2024

Related U.S. Application Data

(60) Provisional application No. 63/478,218, filed on Jan. 3, 2023.

(51) Int. Cl.
*H04N 23/00* (2023.01)
*B60R 1/04* (2006.01)
(Continued)

(52) U.S. Cl.
CPC .............. *B60R 1/04* (2013.01); *G02B 6/0056* (2013.01); *G02B 6/0061* (2013.01); *H04N 7/183* (2013.01); *H04N 23/20* (2023.01); *H04N 23/63* (2023.01); *B60R 2300/10* (2013.01); *B60R 2300/20* (2013.01); *B60R 2300/8066* (2013.01); *G02F 1/13756* (2021.01)

(58) Field of Classification Search
CPC ... B60R 1/04; B60R 2300/10; B60R 2300/20; B60R 2300/8066; B60R 2001/1215; B60R 2001/1253; B60R 1/12; G02B 6/0056; G02B 6/0061; G02B 6/0036; G02B 6/0058; H04N 7/183; H04N 23/20; H04N 23/63; G02F 1/13756; G02F 1/133536

See application file for complete search history.

(56) References Cited

U.S. PATENT DOCUMENTS

| | | | |
|---|---|---|---|
| 6,198,409 B1 * | 3/2001 | Schofield | B60R 1/12 340/436 |
| 6,392,315 B1 * | 5/2002 | Jones | F02P 17/12 307/10.6 |

(Continued)

*Primary Examiner* — Frank F Huang
(74) *Attorney, Agent, or Firm* — Price Heneveld LLP; Brian James Brewer

(57) ABSTRACT

This application is directed to a rearview assembly. The rearview assembly may have a support member, a camera, a backlight, and/or a display. The support member may be substantially transparent to infra-red light. The camera may be disposed in a first direction relative the support member and configured to capture one or more infra-red images. The backlight may comprise a light guide and an edge light configured to emit light into an edge of the light guide. The light guide may be configured to direct the light in a second direction. The second direction may be opposite the first direction. The display may be associated with and supported by the backlight and support member. Further, the display may be disposed in the second direction relative the backlight, configured to receive light from the backlight, and configured to present one or more images for viewing by a user.

20 Claims, 9 Drawing Sheets

(51) Int. Cl.
*F21V 8/00* (2006.01)
*H04N 7/18* (2006.01)
*H04N 23/20* (2023.01)
*H04N 23/63* (2023.01)
*G02F 1/137* (2006.01)

(56) References Cited

U.S. PATENT DOCUMENTS

| | | | | |
|---|---|---|---|---|
| 6,720,920 | B2* | 4/2004 | Breed | G01S 13/931 |
| | | | | 342/357.31 |
| 7,079,017 | B2* | 7/2006 | Lang | G01S 15/931 |
| | | | | 340/436 |
| 7,579,940 | B2* | 8/2009 | Schofield | B60R 11/04 |
| | | | | 701/487 |
| 8,682,035 | B2* | 3/2014 | Stiegler | G06T 7/20 |
| | | | | 701/1 |
| 11,475,576 | B2* | 10/2022 | Kim | G06V 20/58 |
| 2002/0167589 | A1* | 11/2002 | Schofield | B60R 1/26 |
| | | | | 348/E7.086 |
| 2005/0134983 | A1* | 6/2005 | Lynam | B60R 1/12 |
| | | | | 359/872 |
| 2007/0073473 | A1* | 3/2007 | Altan | G01S 13/862 |
| | | | | 701/518 |
| 2007/0181810 | A1* | 8/2007 | Tan | G01S 7/4811 |
| | | | | 250/341.1 |
| 2010/0139995 | A1* | 6/2010 | Rudakevych | B62D 55/06 |
| | | | | 180/9.32 |
| 2010/0164731 | A1* | 7/2010 | Xie | G06V 20/52 |
| | | | | 382/128 |
| 2011/0063445 | A1* | 3/2011 | Chew | G06V 20/52 |
| | | | | 348/E7.085 |
| 2012/0158250 | A1* | 6/2012 | Stiegler | G06T 7/20 |
| | | | | 701/45 |
| 2019/0196486 | A1* | 6/2019 | Ishikawa | G06V 20/597 |
| 2020/0331458 | A1* | 10/2020 | Nakamura | B60W 30/182 |
| 2020/0398637 | A1* | 12/2020 | Chang | G08B 21/22 |
| 2022/0036473 | A1* | 2/2022 | Thompson | G06Q 50/40 |
| 2022/0068137 | A1* | 3/2022 | Nagasawa | G07C 5/008 |
| 2022/0147745 | A1* | 5/2022 | Ghadiok | G06V 20/58 |
| 2022/0219532 | A1* | 7/2022 | Wang | G01S 15/32 |

* cited by examiner

DISPLAY ASSEMBLY

CROSS-REFERENCE TO RELATED APPLICATION

This application claims priority to and the benefit under 35 U.S.C. § 119(e) of U.S. Provisional Patent Application No. 63/478,218, filed on Jan. 3, 2023, entitled "DISPLAY ASSEMBLY," the entire disclosure of which is hereby incorporated herein by reference.

FIELD OF INVENTION

The present invention relates in general to display assemblies and, more particularly, to display assemblies with one or more cameras and/or illumination sources disposed behind a display of the display assembly.

BACKGROUND OF INVENTION

The desire to incorporate driver and/or cabin monitoring systems in vehicles is ever increasing. These systems require a camera for viewing the driver and/or cabin as well as an illumination source. One challenging aspect of implementing these systems is that in addition to the camera and illumination source needing a good field of view, they need to be implemented in an aesthetically pleasing manner. Further, rearview assemblies are positioned such that they offer a great field of view and placement of the camera and/or illumination source behind the mirror element is aesthetically pleasing. However, rearview assemblies are starting to more commonly utilize displays to enable video mirror functionality. This use of displays is problematic as the camera may not see through them, nor may light from the illumination source pass through to illuminate the driver and/or cabin. Accordingly, there is a need for improved rearview assemblies and/or displays.

SUMMARY

In accordance with the present disclosure, the problems associated with display assemblies where a camera and/or illumination source is disposed behind a display have been substantially reduced or eliminated.

According to one aspect of the invention, a rearview assembly is provided for a vehicle, comprising: an edge lit backlight comprising a light guide and an edge light configured to emit light into an edge of the light guide, the light guide configured to direct the light in a second direction; a display associated with and supported by the backlight, the display: disposed in the second direction relative to the backlight, configured to receive light from the backlight, and configured to present one or more images for viewing by a user; and a camera disposed in a first direction relative to the backlight, the first direction opposite the second direction, the camera configured to capture one or more images in the infra-red region through the backlight and the display.

According to another aspect of the invention, a display assembly is provided for a vehicle, comprising: an edge lit backlight comprising a light guide and an edge light configured to emit light into an edge of the light guide, the light guide configured to direct the light in a second direction, the second direction opposite the first direction; a display associated with and supported by the backlight, the display: disposed in the second direction relative the backlight, configured to receive light from the backlight, and configured to present one or more images for viewing by a user; and a camera disposed in a first direction relative the backlight, the first direction opposite the second direction, the camera configured to capture one or more images in the infra-red region through the backlight and the display.

According to yet another aspect of the invention, a rearview assembly is provided for a vehicle, the rearview assembly comprising: a support member substantially transparent in an infra-red region of an electromagnetic spectrum; a camera disposed in a first direction relative the support member, the camera configured to capture one or more images in the infra-red region; an infra-red light source disposed in the first direction relative to the support member for projecting infra-red light through the backlight and the display to illuminate a scene from which the one or more images are captured by the camera; an edge lit backlight comprising a light guide and an edge light configured to emit light into an edge of the light guide, the light guide disposed in the first direction relative to the support member and configured to direct the light in a second direction, the second direction being opposite the first direction; a pair of crossed reflective polarizers disposed between the support member and the light guide, the crossed reflective polarizers operable to substantially prevent visible light from being emitted from the light guide in the second direction, the light guide being substantially transmissive to infra-red light and having selective transmittance based on polarization to visible light; a display associated with and supported by at least one of the backlight and the support member, the display: disposed in the second direction relative to the backlight, configured to receive light from the backlight, and configured to present one or more images for viewing by a user; a switchable diffuser disposed between the display and the light guide, the switchable diffuser configured to operate between a first state where the switchable diffuser is configured to substantially diffuse light transmitted therethrough, and a second state where the switchable diffuser is configured to allow light to be transmitted therethrough without substantial diffusion; a transflective element disposed in the first direction relative to the display such that the displayed images are viewed through the transflective element and such that the camera captures images through the transflective element; and a controller for controlling the camera, the backlight, and the switchable diffuser such that, during image capture by the camera, at least a portion of the backlight is turned off and at least a portion of the switchable diffuser is placed in the second state so as to allow light to be transmitted therethrough to the camera without substantial diffusion.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

Figure 1:
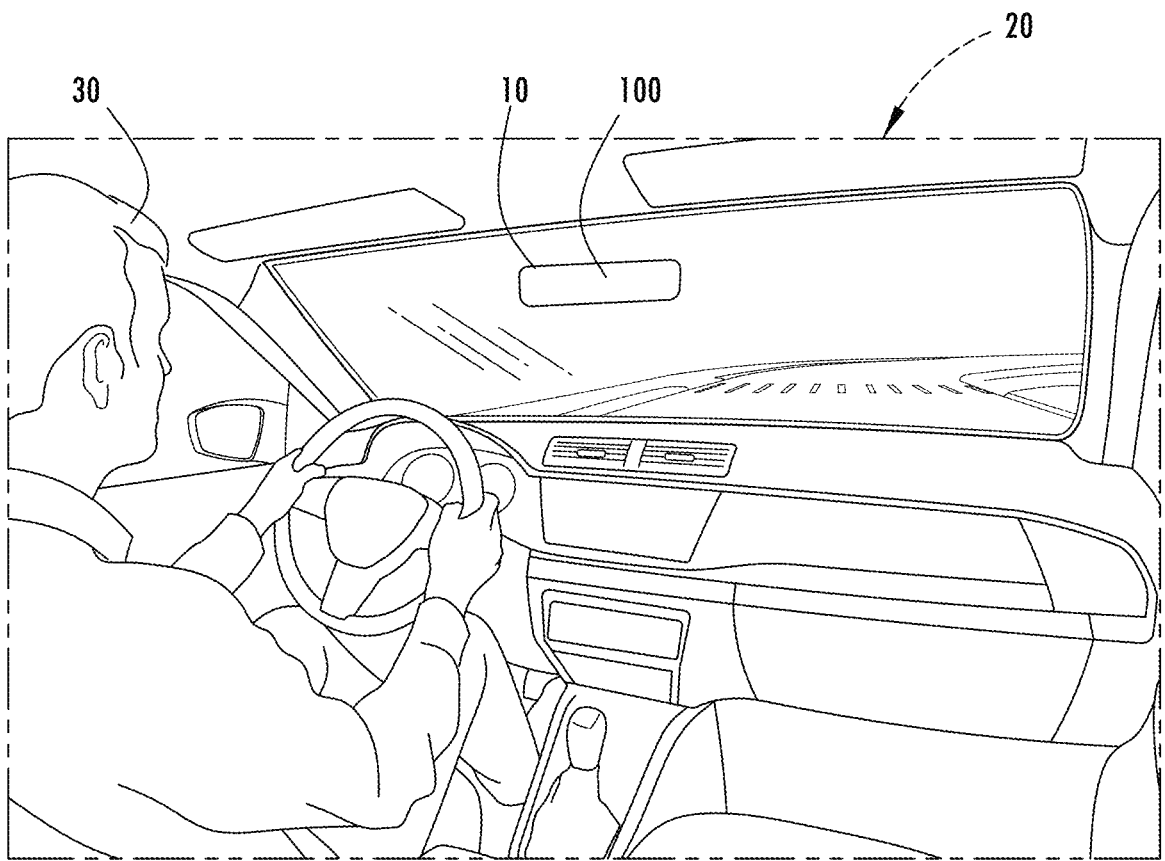
FIG. 1: an implementation of an embodiment of a display assembly.
Figure 2:
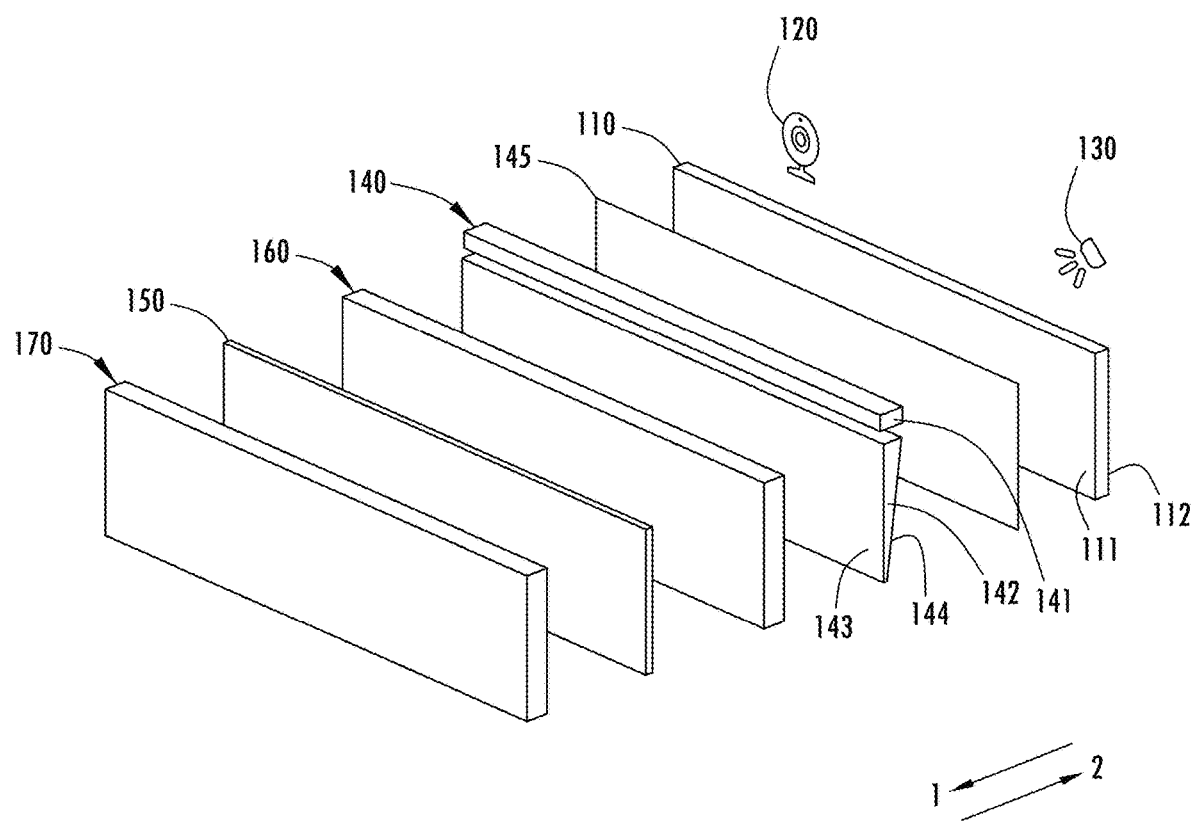
FIG. 2: an exploded perspective view of an embodiment of a display assembly.

For the purposes of description herein, the specific devices and processes illustrated in the attached drawings and described in this disclosure are simply exemplary embodiments of the inventive concepts defined in the appended claims. Hence, specific characteristics relating to the embodiments disclosed herein are not limiting, unless the claims expressly state otherwise.

The present disclosure is directed to a display assembly 100. Accordingly, FIGS. 1-9 illustrate various aspects of embodiments of display assembly 100. Display assembly 100 may comprise: a support member 110, a camera 120, a light source 130, a backlight 140, and/or a display 150. In some embodiments, display assembly 100 may be a part of a rearview assembly 10. As such, display assembly 100 may be disposed within a housing of rearview assembly 10. Further, rearview assembly 10 may be configured for association with a vehicle 20 and to provide a user 30 with a view of a scene rearward relative vehicle 20.

Support member 110 is configured to substantially support one or more elements of display assembly 100. Accordingly, the one or more elements of display assembly 100 may be supported within a housing of rearview assembly 10. Further, support member 110 is substantially transparent in the infra-red region of the electromagnetic spectrum. For example, support member 110 may be composed of a substantially transparent acrylic. Additionally, support member 110 may have a first side 111 and/or a second side 112. First side 111 may be disposed in a first direction 1 relative second side 112. Accordingly, second side 112 may be disposed in a second direction 2 relative first side 111. As such, the first and second directions 1, 2 may be opposite one another. In some embodiments, support member 110 may comprise a lip about a periphery of first side 111. The lip may be configured to hold the one or more elements of display assembly 100 therewithin at a surface of first side 111.

Camera 120 may be any device operable to capture light and generate one or more corresponding images. The captured light may be infra-red light. As such, the one or more corresponding images may be based on the captured infra-red light. Accordingly, camera 120 may be a Semi-Conductor Charge-Coupled Device (CCD) or a pixel sensor of Complementary Metal-Oxide-Semi-Conductor (CMOS) technologies. In some embodiments, camera 120 may have a field of view corresponding to user 30 and/or the passenger compartment of vehicle 20. Further, camera 120 may be disposed in the second direction 2 relative support member 110. Furthermore, camera 120 may be directed toward support member 110 such that support member 110 is optically in front of camera 120. As such, the light captured by camera 120 is transmitted through support member 110.

Light source 130 may be any device operable to emit light. The emitted light may substantially comprise light in the infra-red region of the electromagnetic spectrum. In some embodiments, the emitted light may be substantially centered around 810, 850, or 940 nm. For example, light source 130 may comprise one or more light emitting diodes (LEDs); vertical cavity surface emitting lasers (VCSELs); or halogen, quartz, incandescent, or compact fluorescent ("CFL") light bulbs. Further, light source 130 may be disposed in the second direction 2 relative support member 110. Furthermore, light source 130 may be directed toward support member 110 such that support member 110 is optically in front of light source 130. Such as, the light emitted by light source 130 may be transmitted through support member 110.

Backlight 140 is configured to emit light. The emitted light may be in the visible region of the electromagnetic spectrum. Additionally, the emitted light may be emitted in the first direction 1. Further, backlight 140 may be substantially transparent to light in the infra-red region of the electromagnetic spectrum. Furthermore, backlight 140 may be associated with and/or supported by support member 110 at first side 111. In some embodiments, backlight 140 may be an edge-lit backlight. Additionally, backlight 140 may comprise one or more edge light 141 and a light guide 142. Edge light 141 may be an LED light bar configured to emit light into an edge of light guide 142. Light guide 142 may be configured to direct the light from edge light 141 in the first direction 1, out via a first surface 143 thereof. Further, the light may be emitted across a substantial entirety of the first surface. In some embodiments, light guide 142 may be a wedge optic assembly. Light guide 142, for example, may be an acrylic or polycarbonate member. Additionally, light guide 142 may also have a second surface 144 on a side opposite first surface 143. In some embodiments, light guide 142 may comprise a reflector 145 associated with second surface 142. In some embodiments, reflector 145 may be a pair of crossed reflective polarizers. The crossed reflective polarizers may be operable to substantially prevent visible light from being emitted from light guide 142 in the second direction 2. Additionally, the crossed reflective polarizers may have selective transmittance based on polarization to visible light such that they are substantially transmissive to infra-red light. Accordingly, reflector 145 may be substantially transparent to infra-red light and substantially opaque and/or reflective to visible light.

Figure 3:
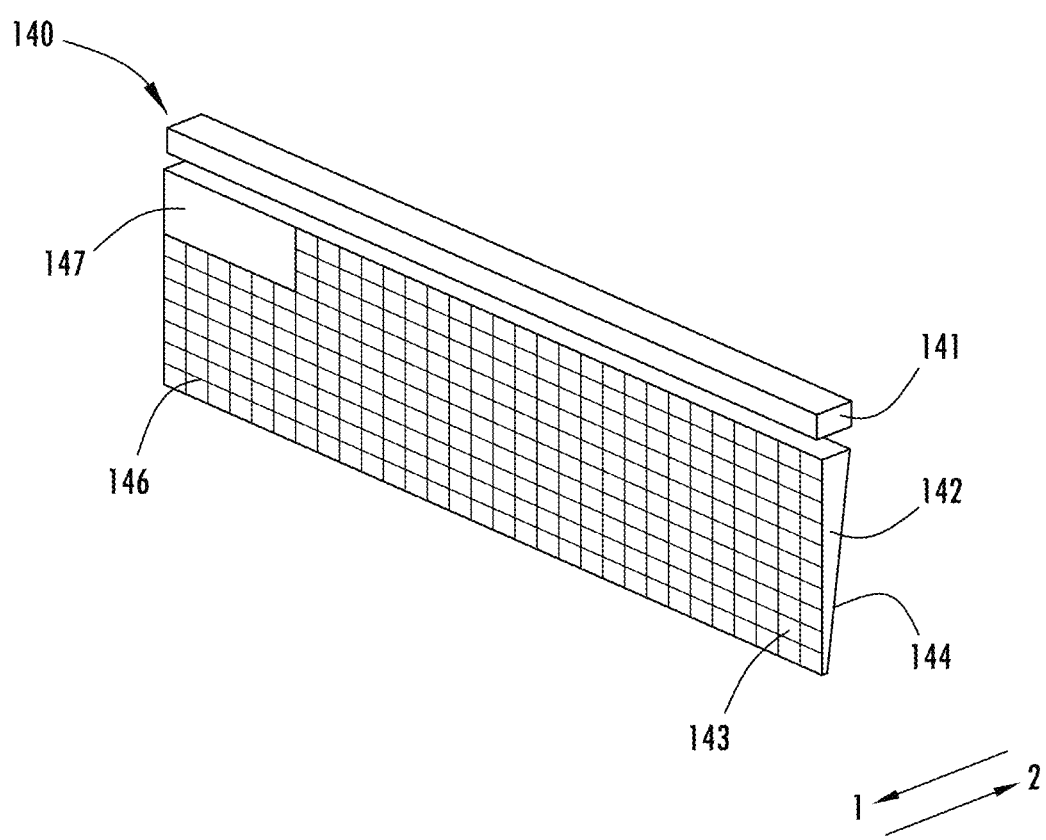
FIG. 3: a perspective view of an embodiment of a backlight.

In some embodiments, as shown in FIG. 3, light guide 142 may have a plurality of lenses 146. Lenses 146 may be configured to direct the emitted light in the first direction 1 out first surface 143. Additionally, the lenses 146 may be distributed across light guide 142 in a gradient such that their concentration increases as a distance to edge light 141 increases. Distributing lenses 146 in such a gradient may have the advantage of increasing the homogenization of the light emitted from backlight 140. In some such embodiments, lenses 146 may be distributed across a substantial entirety of light guide 142. In other such embodiments, lenses 146 may be arranged such that a window 147 is defined and/or created. Window 147 may be lens-free or have a reduced concentration of lenses 146 relative to areas immediately outside of window 147. Further, window 147 may be in substantial optical alignment with camera 120. An advantage of such an embodiment may be that camera 120 may capture images with increased clarity due to a reduction in interference caused by lenses 146.

Figure 4:
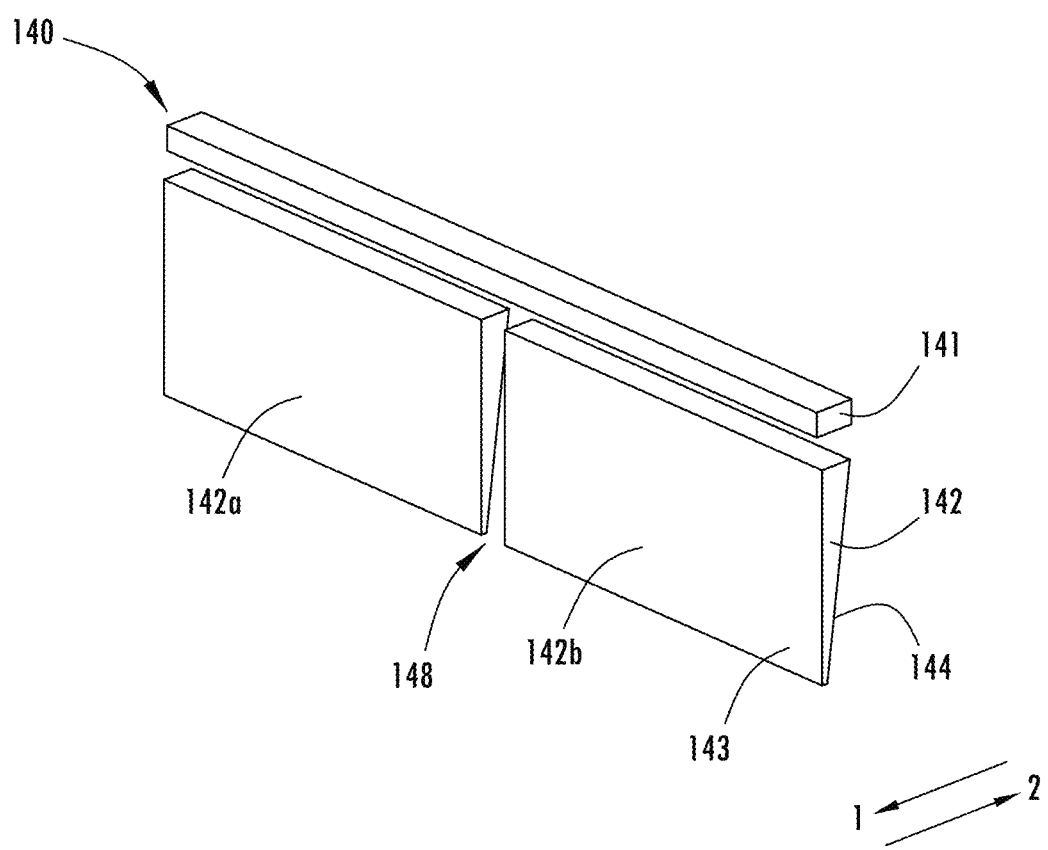
FIG. 4: a perspective view of an embodiment of a backlight.
Figure 5:
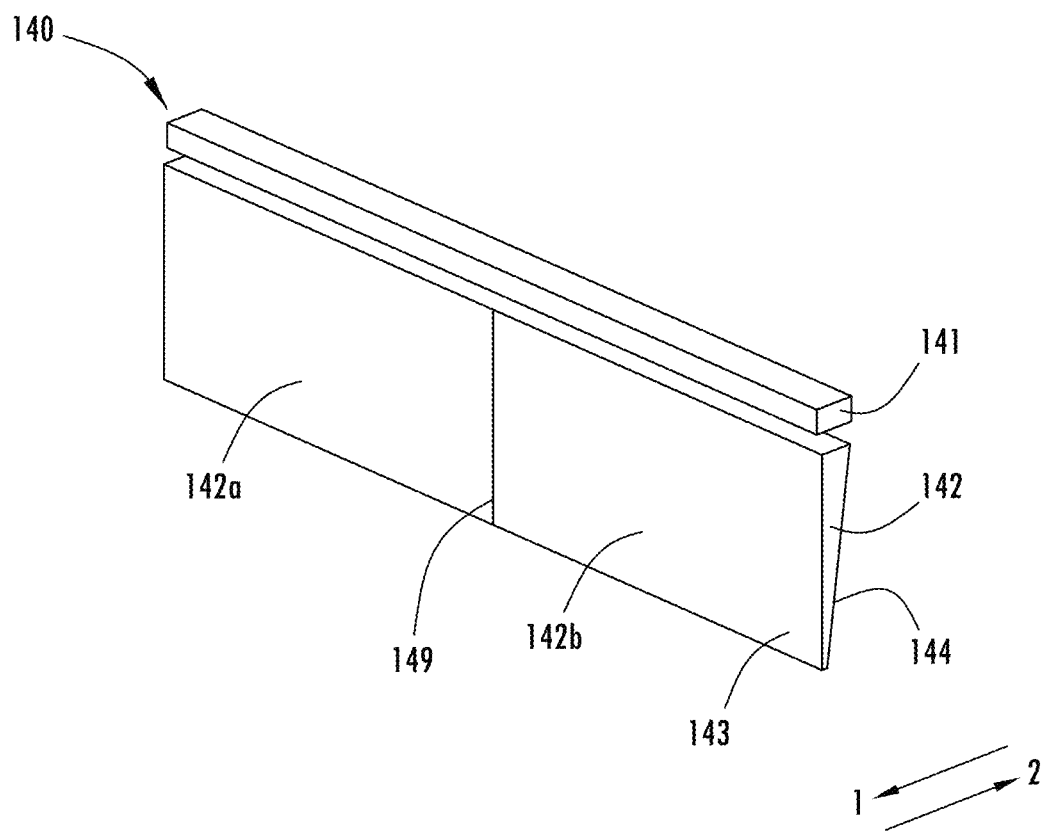
FIG. 5: a perspective view of an embodiment of a backlight.

In some embodiments, as shown in FIGS. 4-5, light guide 142 may be segmented. In some such embodiments, as shown in FIG. 4, light guide 142 may be segmented by a gap 148 such that light guide 142 comprises multiple segments or parts. In other such embodiments, as shown in FIG. 5, light guide 142 may be segmented by a blocking element 149. Blocking element 149 may be an element configured to prevent or reduce infra-red light from transmitting therethrough. One example of blocking element 149 may be a non-transparent layer. Another example of blocking element 149 may be a laser pattern formed in light guide 142. The laser pattern may be internally formed into light guide 142 via laser ablation. This laser patterning may result in micro fracturing of the light guide 142 to form blocking element 149. These micro fractures may create internal diffusion of light transmitting therethrough. Additionally, light guide 142 may be segmented such that a first segment 142a is optically aligned with camera 120 and a second segment 142b is optically aligned with light source 130. By optically aligning camera 120 and light source 130 with different segments of light guide 142, the quality of images captured by camera 120 may be increased. This increase in quality may be a result of a reduction or elimination of light from light source 130 propagating through light guide 142 and interfering camera 120 since the propagation may be substantially reduced by the segmentation.

Display 150 may be configured to variably transmit various components of visible light therethrough to generate an image viewable by user 30 from the first direction 1. The image, for example, may correspond to a scene rearward relative vehicle 20. Additionally, display 150 may be substantially transparent to infra-red light. Accordingly, display 150, for example, may be a liquid crystal display panel. Further, display 150 may be associated with and/or supported by support member 110 and/or backlight 140. Furthermore, display 150 may be disposed in the first direction 1 relative support member 110 and/or backlight 140. As such, the visible light emitted by backlight 140 may be received by display 150 and variably transmitted to generate the image.

Figure 6:
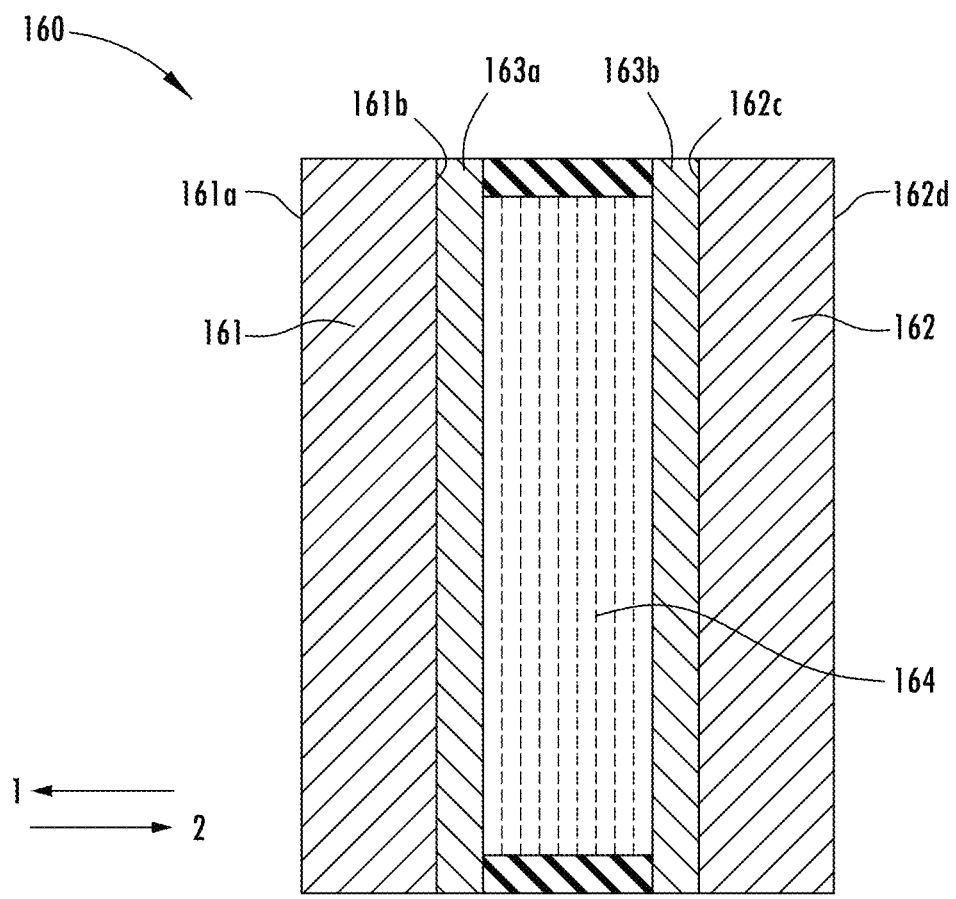
FIG. 6: a cross-sectional view of an embodiment of a switchable diffuser.
Figure 7A:
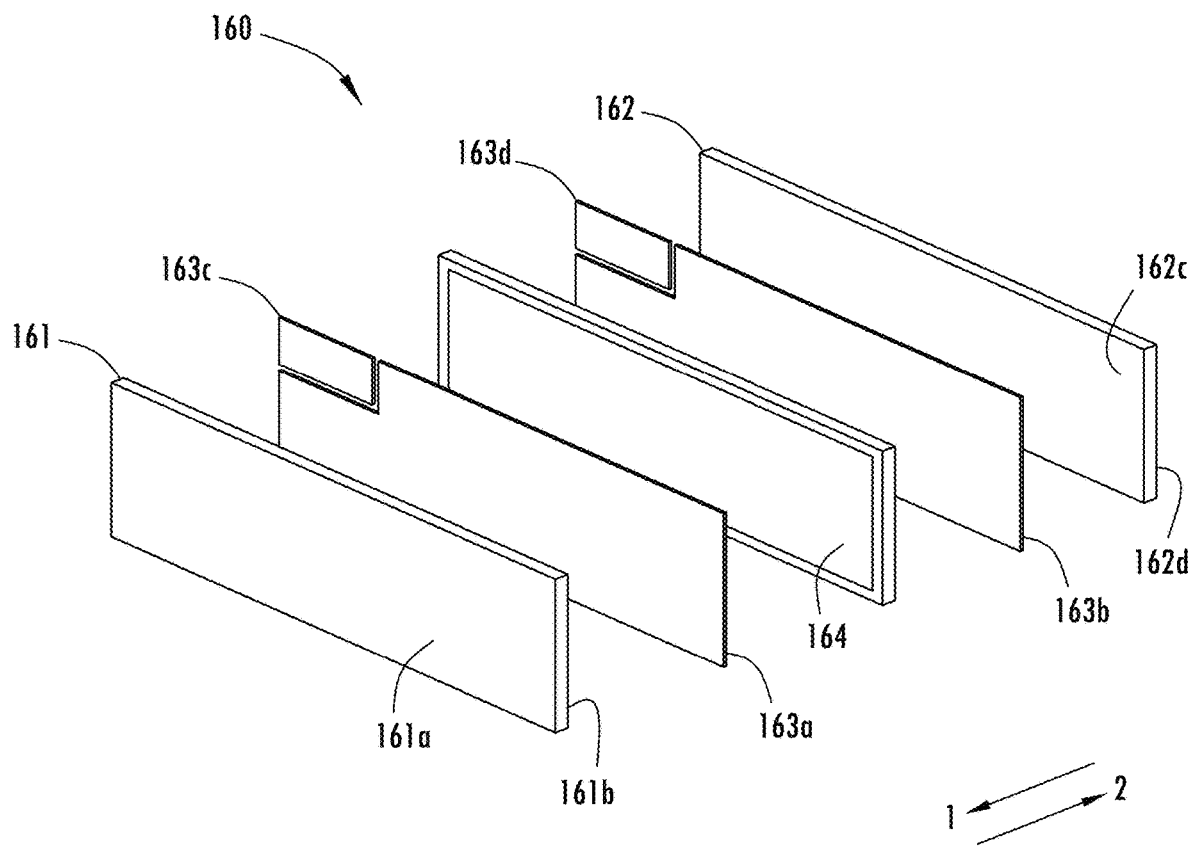
FIG. 7a: an exploded perspective view of an embodiment of a switchable diffuser.
Figure 7B:
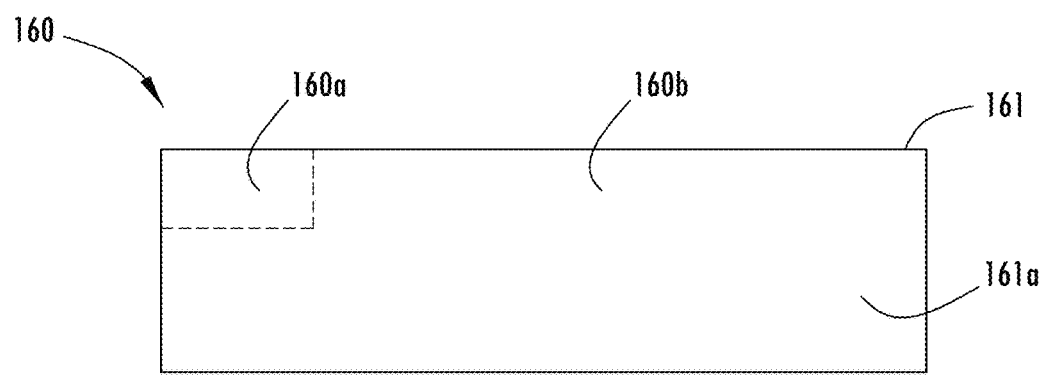
FIG. 7b: a front perspective view of an embodiment of a switchable diffuser.

In some embodiments, display assembly 100 may further comprise a switchable diffuser 160. Switchable diffuser 160 may be configured to operate between a first state and a second state. One of the first and second states may be configured to substantially diffuse light transmitted therethrough. The other of the first and second states may be configured to substantially transmit light therethrough without diffusion. Further, switchable diffuser 160 may be associated with and/or supported by support member 110 and/or backlight 140. Furthermore, switchable diffuser 160 may be disposed between backlight 140 and display 150. Additionally, switchable diffuser 160 may extend across a substantial entirety of first side 111 and/or display 150. In some embodiments, switchable diffuser 160 may have a single zone construction. In other embodiments, as shown in FIGS. 7a-7b, switchable diffuser 160 may have a multi-zone construction. In some such embodiments, a zone may be substantially optically aligned with and/or limited to alignment with camera 120 and/or the window 147 of light guide 142. Switchable diffuser 160, for example, may comprise a first substrate 161, a second substrate 162, a plurality of electrodes 163, and a switchable diffusive media 164, as shown in FIGS. 6-7b.

First substrate 161 may be substantially transparent in the visible and/or infra-red regions of the electromagnetic spectrum. Further, first substrate 161 may have a first surface 161a and a second surface 161b. First surface 161a and second surface 161b may be disposed on opposite sides of first substrate 161. Additionally, first substrate 161, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid© CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Second substrate 162 may have two surfaces designated as a third surface 162a and a fourth surface 162b. Third surface 162a and fourth surface 162b may be disposed on opposite sides of second substrate 162. Additionally, second substrate 162 may be disposed in a substantially parallel and spaced apart relationship relative first substrate 161. Further, third surface 162a may face second surface 161b. Additionally, second substrate 162 may be substantially transparent in the visible and/or infra-red regions. Accordingly, second substrate 162 may be comprised of the same or similar materials suitable for first substrate 161.

The plurality of electrodes 163 may comprise a first electrode 163a and a second electrode 163b. The electrodes 163 may comprise electrically conductive materials. Further, the electrodes 163 may be substantially transparent in the visible and infra-red regions of the electromagnetic spectrum. For example, the electrically conductive material may be a transparent conductive oxide (TCO), such as fluorine doped tin oxide (FTO), indium tin oxide (ITO), indium zinc oxide (IZO), or aluminum doped zinc oxide (AZO). First electrode 163a may be associated with first substrate 161 and second electrode 163b may be associated with second substrate 162. In some embodiments, first electrode 163a may be associated with second surface 161b, and second electrode 163b may be associated with third surface 161c. Further, the first and second electrodes 163a, 163b are substantially aligned with one another. In embodiments where switchable diffuser 160 has a single zone construction, the first and second electrodes 163a, 163b may extend across a substantial entirety of switchable diffuser 160. Conversely, where switchable diffuser 160 has a multi-zone construction, the first and second electrodes 163a, 163b may be substantially limited to a first zone 160a thereof. Additionally, in such an embodiment, the plurality of electrodes 163 may further comprise a third electrode 163c and a fourth electrode 164d, each within a second zone 160b thereof. The third electrode 163c may be associated with first substrate 161 and second electrode 163b may be associated with second substrate 162. In some embodiments, third electrode 163c may be associated with second surface 161b, and fourth electrode 163d may be associated with third surface 161c. The first and third electrodes 163a, 163c may be electrically separated from one another. Likewise, the second and fourth electrodes 163b, 163d may also be electrically separated from one another. The electrical separations may be achieved via one or more laser ablation lines.

Switchable diffusive media 164 may be configured to operate between a first state and a second state. One of the first and second states may be configured to substantially diffuse light transmitted therethrough. The other of the first and second states may be configured to substantially transmit light therethrough without diffusion. For example, switchable diffusive media 164 may be a polymer dispersed liquid crystal (PDLC) medium or a suspended particle liquid crystal (SPLC) medium. Operation between the first and second states may be based, at least in part, on exposure to an electrical field. Further, switchable diffusive media 164 may be disposed between the first and second electrodes 163a, 163b and/or the third and fourth electrodes 163c, 163d. Additionally, switchable diffusive media 164 may be in different states in different zones due to differences in electrical fields in each zone.

In operation, each zone of switchable diffuser 160 may independently be configured to generate an electrical field therein via a pair of electrodes (e.g., the first and third electrodes 163a, 163c or the second and fourth electrodes 163b, 163d). Embodiments of display assembly 110 having switchable diffuser 160 may have the advantage of superior display image quality due to enhanced light homogenization. The enhanced light homogenization may be achieved by switchable diffuser 160 being in a diffusive state and thus diffusing the light emitted by backlight 140. Additionally, display assembly 110 may further have the advantage of superior quality of the images captured by camera 120. The quality of the images captured by camera 120 may be improved because switchable diffuser 160 may be switched to a non-diffusive state during imaging. Traditional display assemblies utilize static diffuser films which would substantially interfere with the image quality of the images captured by camera 120.

Figure 8:
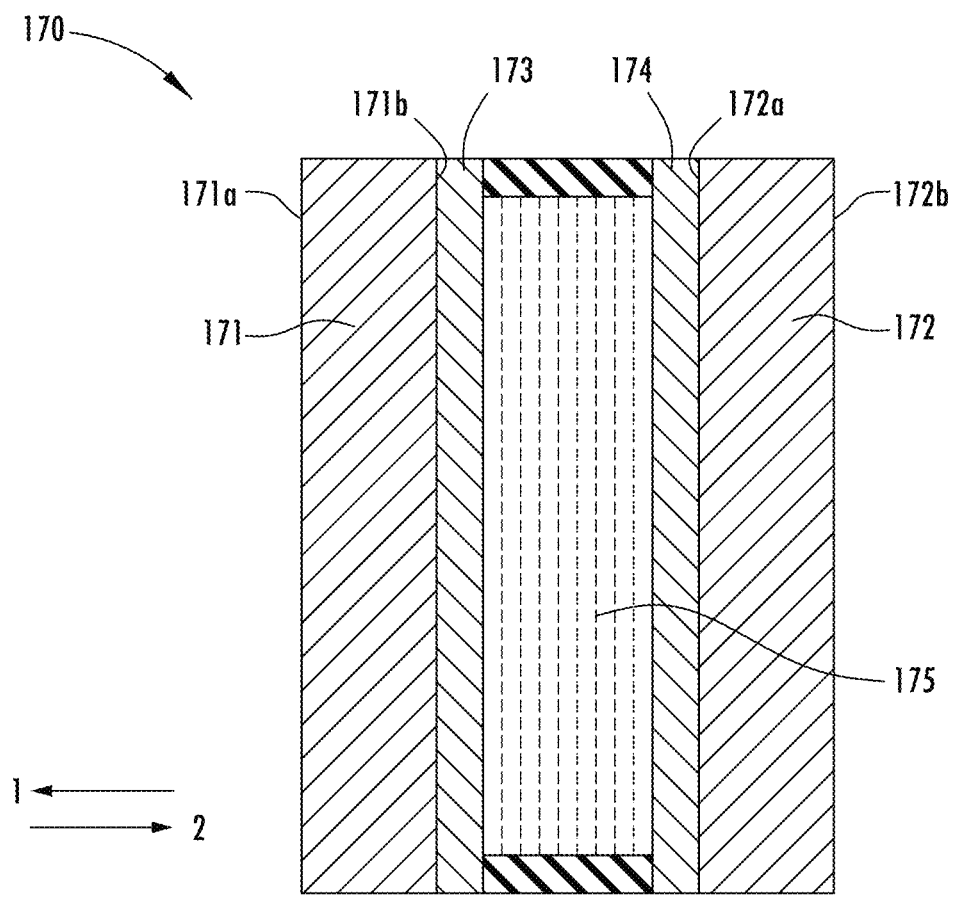
FIG. 8: a cross-sectional view of an embodiment of a transflective element.

In some embodiments, display assembly 100 may further comprise a transflective element 170. Transflective element 170 may be disposed in the first direction 1 relative display 150. As such transflective element 170 may be associated with display 150. Transflective element 170 may be configured to substantially reflect light from the first direction 1 and substantially transmit light from the second direction 2. Accordingly, transflective element 170 may provide user 30 with a reflected view of the scene rearward relative vehicle 20, like a traditional mirror. Additionally, transflective element 170 may still allow for viewing of the image emitted by display 150 when display backlight 140 is on. In some embodiments, transflective element 170 may be a multilayer thin film or a reflective polarizer. In other embodiments, transflective element 170 may be variably transmissive. Accordingly, transflective element 170 may be operable to dim. In some such embodiments, transflective element 170 may be an electro-optic element. Thus, as shown in FIG. 8, transflective element 170 may comprise a first substrate 171, a second substrate 172, a first electrode 173, a second electrode 174, and/or an electro-active medium 175. Further, transflective element 170 may be operable between a substantially activated state and a substantially un-activated state. Operation between such states may correspond to the variable transmissivity of transflective element 170.

First substrate 171 may be substantially transparent in the visible and/or infra-red regions of the electromagnetic spectrum. Further, first substrate 171 may have a first surface 171a and a second surface 171b. First surface 171a and second surface 171b may be disposed opposite one another with second surface 171b disposed in the second direction 2 relative first surface 171. Additionally, first substrate 171, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid© CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Similarly, second substrate 172 may have two surfaces designated as a third surface 172a and a fourth surface 172b. Third surface 172a and fourth surface 172b may be disposed opposite one another with fourth surface 172b disposed in the second direction relative third surface 172a. Additionally, second substrate 172 may be disposed in the second direction 2 in a substantially parallel and spaced apart relationship relative first substrate 171. Thus, third surface 172a may face second surface 171b. Further, second substrate 172 may be substantially transparent in the visible and/or infra-red regions. Accordingly, second substrate 172 may be comprised of the same or similar materials suitable for first substrate 171.

First electrode 173 is an electrically conductive member associated with second surface 171b. Thus, in some embodiments, first electrode 173 is disposed, at least in part, on second surface 171b. The electrodes 163 may comprise electrically conductive materials. Further, the electrodes 163 may be substantially transparent in the visible and infra-red regions of the electromagnetic spectrum. For example, the electrically conductive material may be a transparent conductive oxide (TCO), such as fluorine doped tin oxide (FTO), indium tin oxide (ITO), indium zinc oxide (IZO), or aluminum doped zinc oxide (AZO).

Similarly, second electrode 174 is an electrically conductive member associated with third surface 172a. Thus, in some embodiments, second electrode 174 may be disposed, at least in part, on third surface 172a. Further, second electrode 174 may be comprised of the same or similar materials suitable for first electrode 173. Additionally or alternatively, in some embodiments, second electrode 174 may further comprise a transflective layer or stack of layers.

Electro-optic medium 175 may be disposed between the first and second electrodes 173 and 174. Further, electro-optic medium 175 may be operable between substantially activated and un-activated states based, at least in part, on exposure to a particular electrical potential. Accordingly, electro-optic medium 175 may be an electrochromic medium. In embodiments where electro-optic medium 175 is electrochromic, in an activated state, electro-optic medium 175 may be operable to exhibit a change, relative an un-activated state, in its extinction coefficient at one or more wavelengths in the electromagnetic spectrum. In some such embodiments, this change may occur in the visible region of the electromagnetic spectrum.

In some embodiments, display assembly 100 may not have an anti-glare film disposed on a front 101 thereof. Front 101 may be a surface of display assembly 100 that would be closest to user 30 under normal operating conditions. The elimination of an anti-glare film may be advantageous to display assembly 100, because anti-glare films commonly utilize an optically rough surface. This optically rough surface may be detrimental to the quality of the images captured by camera 120. Instead, display assembly 100 may comprise a polarization film at the front surface.

In operation, light source 130 may be operable to emit infra-red light in the first direction 1. The infra-red light may transmit through the remainder of display assembly 100 in the first direction and be emitted therefrom. This infra-red light may accordingly illuminate user 30 and/or the passenger compartment of vehicle 20. Further, camera 120 may be operable to receive the reflected illumination and generate a corresponding image through the elements of display assembly 100 positioned there in front of, such as support member 110, backlight 140, and display 150.

Figure 9:
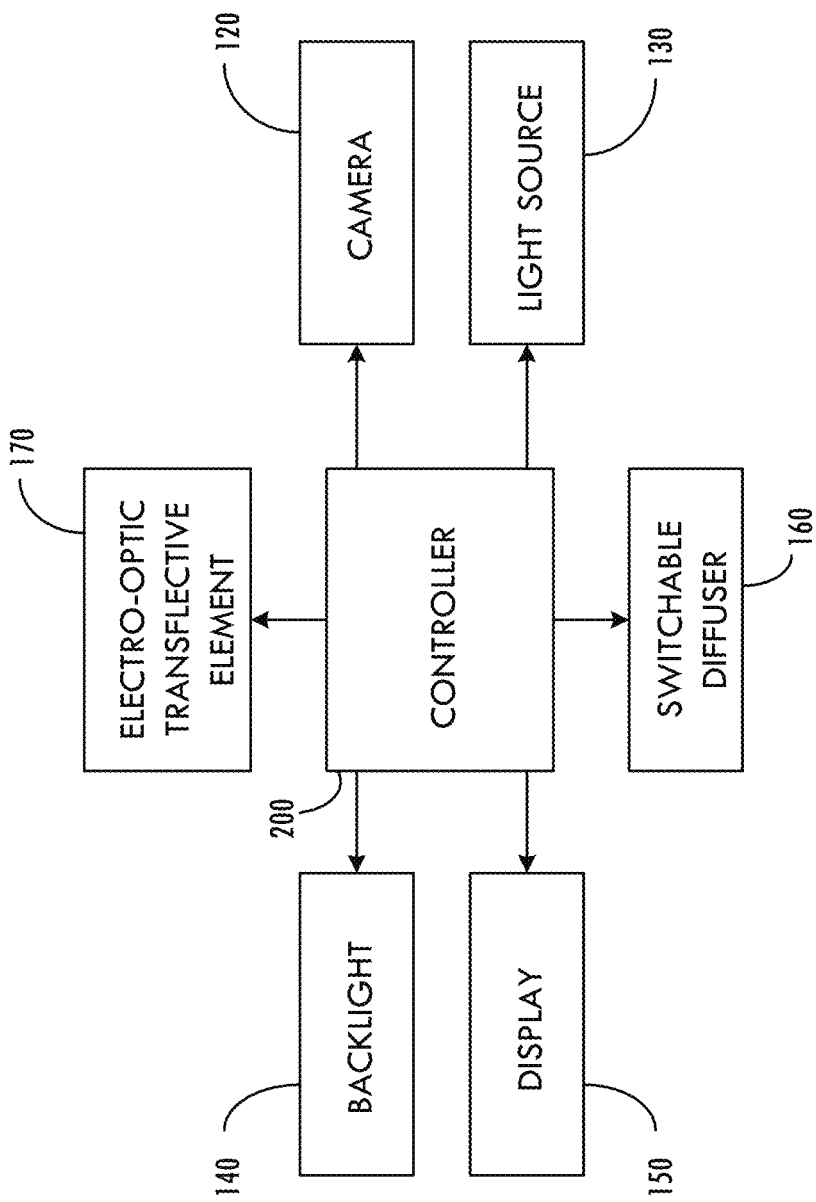
FIG. 9: an electrical circuit diagram in block form of the electrical components of the display assembly shown in the other figures.

FIG. 9 shows an electrical circuit diagram of the electrical components described above in addition to a controller 200 that controls these electrical components. More specifically, the controller 200 controls the camera 120, the backlight 140, and the switchable diffuser 160 such that, during image capture by the camera 120, at least a portion of the backlight 140 is turned off and at least a portion of the switchable diffuser 160 is placed in the second state so as to allow light to be transmitted therethrough to the camera 120 without substantial diffusion. If the light guide 142 is segmented, the controller 200 would cause the edge lights 141 associated with the segment 142a aligned with the camera 120 to be turned off. If the switchable diffuser 160 has different zones, the controller 200 would cause only the zone 160a aligned with the camera 120 to be in the second state (undiffused). This provides the least obstruction to the camera 120 when capturing images.

When the camera 120 is not capturing images, the controller 200 would cause edge lights 141 associated with the segment 142a aligned with the camera 120 to be turned on. Likewise, the controller 200 would cause the zone 160a aligned with the camera 120 to be in the first state (diffused). This provides more uniform backlighting of the display 150.

The controller 200 may also control the IR light source(s) 130 to be active at least whenever the camera 120 is capturing images.

The controller 200 may also control the electro-optic transflective element 170 to adjust the reflectivity thereof. The reflectivity may be adjusted depending on whether the display 150 is turned on or off and in response to ambient and glare light levels that may be sensed by camera 120 or by separate sensors.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "opaque" is applied in the relative sense. "Opaque" refers to an optical element or material that is not appreciably transparent or translucent at wavelengths in question and thus generally does not allow light at such wavelengths to pass therethrough. The wavelengths in question will vary based on the context. However, in the event the wavelengths in question are not readily apparent, the wavelengths in question shall generally refer to visible light.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question are not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

What is claimed is:

1. A rearview assembly for a vehicle, comprising:
an edge lit backlight comprising a light guide and an edge light configured to emit light into an edge of the light guide, the light guide configured to direct the light in a second direction;
a display associated with and supported by the backlight, the display:
disposed in the second direction relative to the backlight,
configured to receive light from the backlight, and
configured to present one or more images for viewing by a user; and
a camera disposed in a first direction relative to the backlight, the first direction opposite the second direction, the camera configured to capture one or more images in the infra-red region through the backlight and the display.

2. The rearview assembly of claim 1, wherein the device is a rearview assembly and the one or more images presented by the display are of a scene rearward relative to the vehicle.

3. The rearview assembly of claim 1, further comprising a crossed reflective polarizer film disposed in the first direction relative to the light guide, the polarizer film configured to selectively polarize light in a visible region of the electromagnetic spectrum and to substantially transmit light in the infra-red region.

4. The rearview assembly of claim 1, wherein the light guide has a plurality of lenses configured to direct the light in the second direction.

5. The rearview assembly of claim 4, wherein the lenses are disposed in a gradient configured to substantially homogenize the light directed in the second direction.

6. The rearview assembly of claim 4, wherein a zone of the light guide has a reduced concentration of lenses, the zone in optical alignment with the camera.

7. The rearview assembly of claim 6, wherein the zone has no lenses therewithin.

8. The rearview assembly of claim 1, wherein the light guide is segmented.

9. The rearview assembly of claim 8, wherein a first segment of the light guide is substantially optically aligned with the camera and a second segment is substantially optically aligned with an illumination source disposed in the first direction relative the backlight.

10. The rearview assembly of claim 1, further comprising a switchable diffuser disposed between the display and the light guide, the switchable diffuser configured to operate between:
a first state where the switchable diffuser is configured to substantially diffuse light transmitted therethrough; and
a second state where the switchable diffuser is configured to allow light to be transmitted therethrough without substantial diffusion.

11. The rearview assembly of claim 10, wherein:
the switchable diffuser comprises a first zone and a second zone, each zone independently operable between the first state and the second state;
the first zone is substantially optically aligned with the camera; and
the switchable diffuser is configured to be in the second state in the first zone when the camera is capturing the one or more images.

12. The rearview assembly of claim 10, and further including a controller for controlling the camera, the backlight, and the switchable diffuser such that, during image capture by the camera, at least a portion of the backlight is turned off and at least a portion of the switchable diffuser is placed in the second state so as to allow light to be transmitted therethrough to the camera without substantial diffusion.

13. The rearview assembly of claim 1, and further comprising a transflective element disposed in the first direction relative to the display such that the displayed images are viewed through the transflective element and such that the camera captures images through the transflective element.

14. The rearview assembly of claim 13, wherein the transflective element is an electro-optic mirror element for selectively varying the reflectance of the transflective element.

15. The rearview assembly of claim 1, and further comprising an infra-red light source disposed in the first direction of the backlight for projecting infra-red light through the backlight and the display to illuminate a scene from which the one or more images are captured by the camera.

16. A display assembly for a vehicle, comprising:
an edge lit backlight comprising a light guide and an edge light configured to emit light into an edge of the light guide, the light guide configured to direct the light in a second direction, the second direction opposite the first direction;
a display associated with and supported by the backlight, the display:
disposed in the second direction relative the backlight,
configured to receive light from the backlight, and
configured to present one or more images for viewing by a user; and
a camera disposed in a first direction relative the backlight, the first direction opposite the second direction, the camera configured to capture one or more images in the infra-red region through the backlight and the display.

17. The display assembly of claim 16, further comprising a switchable diffuser disposed between the display and the light guide, the switchable diffuser configured to operate between:
a first state where the switchable diffuser is configured to substantially diffuse light transmitted therethrough; and
a second state where the switchable diffuser is configured to allow light to be transmitted therethrough without substantial diffusion.

18. The display assembly of claim 17, wherein:
the switchable diffuser comprises a first zone and a second zone, each zone independently operable between the first state and the second state;
the first zone is substantially optically aligned with the camera; and
the switchable diffuser is configured to be in the second state in the first zone when the camera is capturing the one or more images.

19. The display assembly of claim 16, and further comprising an infra-red light source disposed in the first direction of the backlight for projecting infra-red light through the backlight and the display to illuminate a scene from which the one or more images are captured by the camera.

20. A rearview assembly for a vehicle, the rearview assembly comprising:
a support member substantially transparent in an infra-red region of an electromagnetic spectrum;
a camera disposed in a first direction relative the support member, the camera configured to capture one or more images in the infra-red region;
an infra-red light source disposed in the first direction relative to the support member for projecting infra-red light through the backlight and the display to illuminate a scene from which the one or more images are captured by the camera;
an edge lit backlight comprising a light guide and an edge light configured to emit light into an edge of the light guide, the light guide disposed in the first direction relative to the support member and configured to direct the light in a second direction, the second direction being opposite the first direction;
a pair of crossed reflective polarizers disposed between the support member and the light guide, the crossed reflective polarizers operable to substantially prevent visible light from being emitted from the light guide in the second direction, the light guide being substantially transmissive to infra-red light and having selective transmittance based on polarization to visible light;
a display associated with and supported by at least one of the backlight and the support member, the display:

disposed in the second direction relative to the backlight,
configured to receive light from the backlight, and
configured to present one or more images for viewing by a user;
a switchable diffuser disposed between the display and the light guide, the switchable diffuser configured to operate between:
a first state where the switchable diffuser is configured to substantially diffuse light transmitted therethrough, and
a second state where the switchable diffuser is configured to allow light to be transmitted therethrough without substantial diffusion;
a transflective element disposed in the first direction relative to the display such that the displayed images are viewed through the transflective element and such that the camera captures images through the transflective element; and
a controller for controlling the camera, the backlight, and the switchable diffuser such that, during image capture by the camera, at least a portion of the backlight is turned off and at least a portion of the switchable diffuser is placed in the second state so as to allow light to be transmitted therethrough to the camera without substantial diffusion.

* * * * *